April 5, 1960  E. C. CARLSON  2,931,362
CORN SHELLER
Original Filed June 14, 1955  3 Sheets-Sheet 3
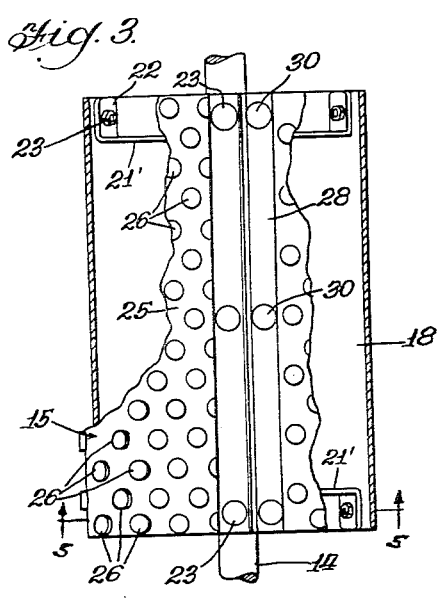
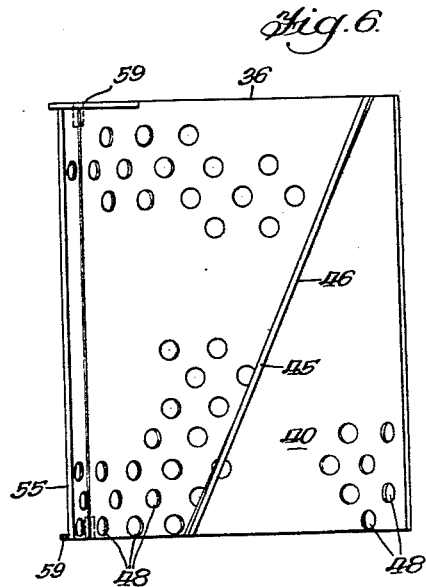
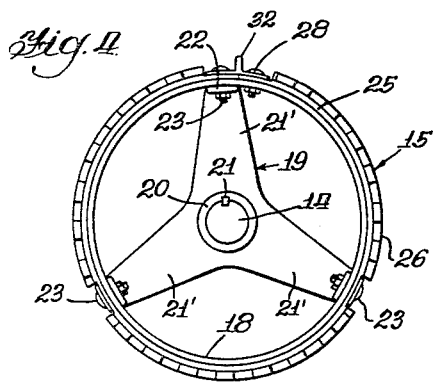
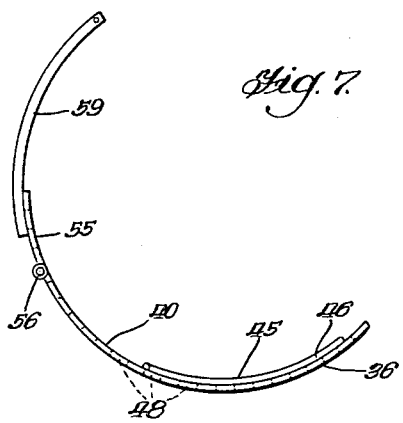
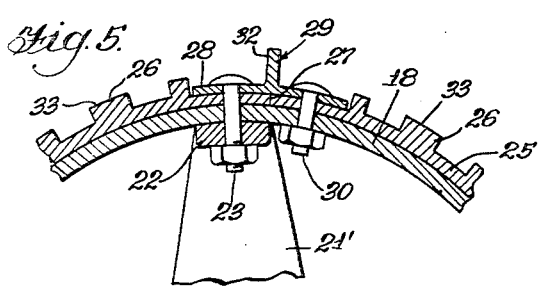
Inventor:
Ernest C. Carlson
Paul O. Pippel
Atty.

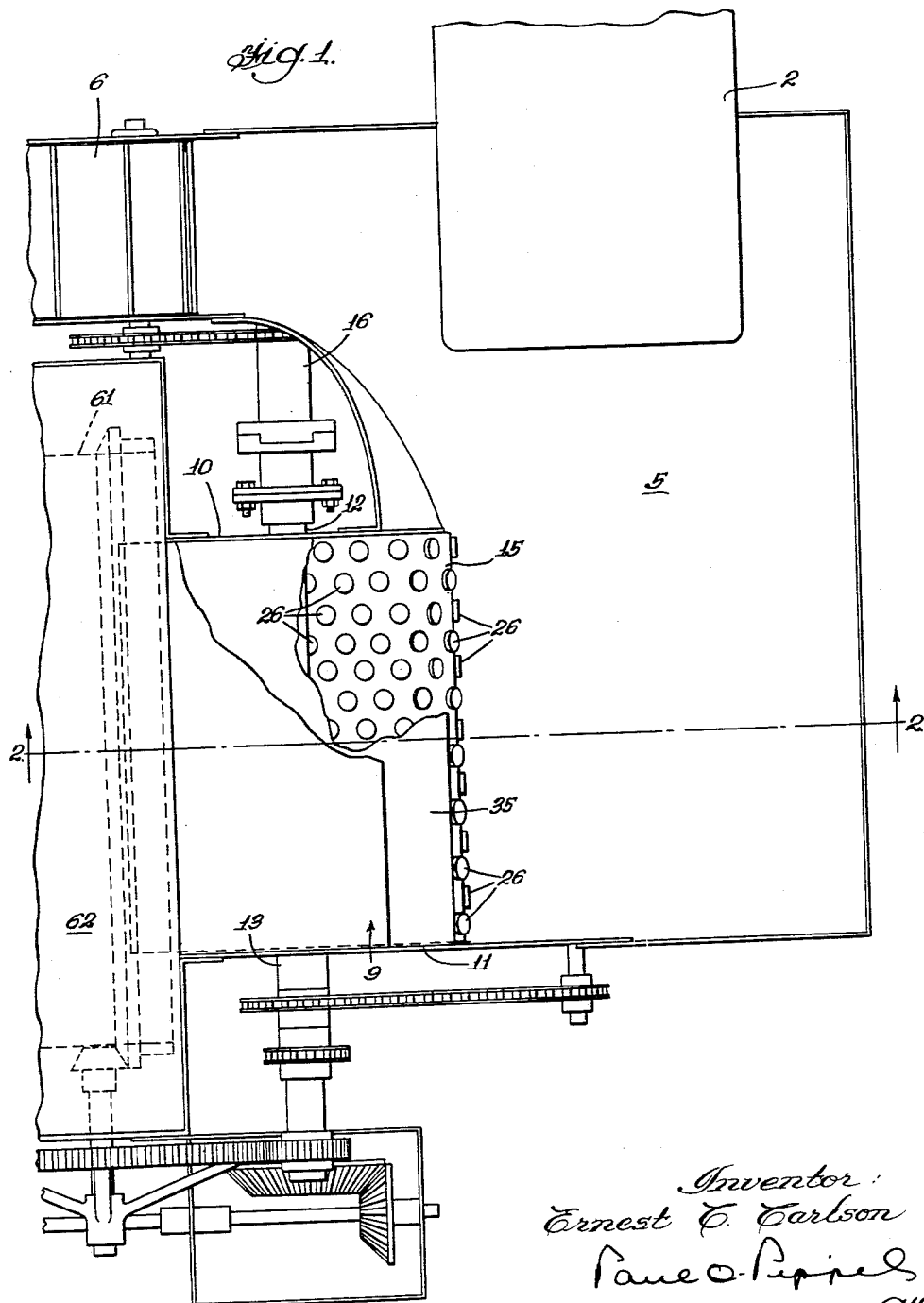

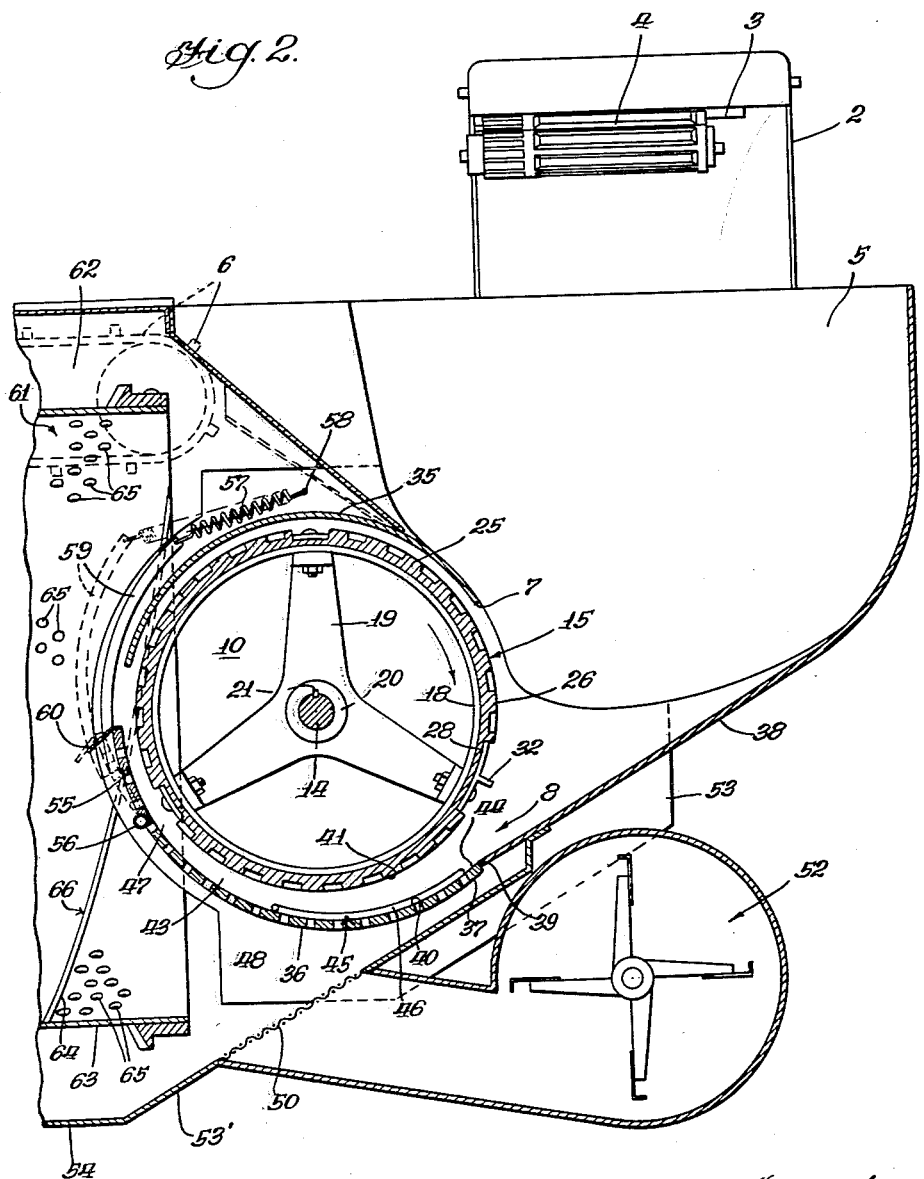

United States Patent Office 2,931,362
Patented Apr. 5, 1960

2,931,362

CORN SHELLER

Ernest C. Carlson, Wheaton, Ill., assignor to International Harvester Company, a corporation of New Jersey Original application June 14, 1955, Serial No. 515,367, now Patent No. 2,842,139, dated July 8, 1958. Divided and this application September 11, 1957, Serial No. 683,348

7 Claims. (Cl. 130—6)

This invention relates to corn shellers and is a divisional application from my U.S. application Serial No. 515,367 filed June 14, 1955 for Corn Sheller now U.S. Patent No. 2,842,139.

The general object of the invention is to provide an improved and novel corn sheller which performs in an efficient manner and is substantially entirely free from plugging.

A more specific object of the invention is to provide a novel corn sheller incorporating a housing with a concave which is provided with an ear positioner for aligning the ears of corn in proper manner with respect to the shelling cylinder.

The further object of the invention is to provide a novel cylinder with a breaker bar which is adapted to shear and remove any cobs which may wedge between the shelling cylinder and the concave.

These and other objects of the invention will become more apparent from the specification and the drawings wherein:

Figure 1 is a fragmentary plan view of the corn sheller shown partially in horizontal section and illustrated in connection with associated delivery and discharge mechanism.

Figure 2 is a transverse sectional view of the structure shown in Figure 1 taken substantially on the line 2—2 of Figure 1.

Figure 3 is a side elevational view of the shelling cylinder partially in axial section.

Figure 4 is an axial end view of the shelling cylinder.

Figure 5 is a sectional view taken substantially on the line 5—5 of Figure 3 on an enlarged scale.

Figure 6 is a plan view of the concave partially in horizontal section; and

Figure 7 is an end view of the concave.

In the drawings there is shown an ear delivery conveyor 2 of one of a 2-row corn harvesting unit (not shown) which is adapted to be mounted on the tractor (not shown) at each side thereof, as is conventional practice. The conveyor structure 2 is shown with its rearward discharge extremity 3 as overhanging a pair of cleaning cylinders 4 which are adapted to catch stalks of corn which are adapted to pass therealong while the ears drop into the hopper 5, said hopper also receiving delivery from a cross-conveyor 6 from the other harvesting unit (not shown) at the opposite side of the tractor of the 2-row corn picker. The conveyor 6 discharges into the hopper 5 and the said hopper has a gravitational discharge through a lower open end or opening 7 into the shelling chamber or throat 8.

The shelling chamber 8 is constituted by a housing or cage generally designated 9 which includes a pair of end walls or panels 10 and 11 which support on bearings 12 and 13 connected to said walls, the center shaft 14 of a cylindrical shelling cylinder or drum generally designated 15. The forward end of the shaft 14 is connected in the present instance to the power take-off shaft 16 of the associated tractor which is not shown. However, it will be understood that any other source of power may be utilized and that the hopper 5 does not necessarily have to be associated in conjunction with the discharge on the corn pickers but that the corn pickers may be discharged into the wagon and then the sheller may be fed separately from the wagon.

The shelling cylinder 15 comprises a cylindrical peripheral tubular metallic member 18 which is supported at each end by a pair of spiders 19 and concentric with the shaft 14, the spiders 19 having a central hub portion 20 which is keyed as at 21 to the shaft and a plurality of outstanding arms 21′ which extend radially and at their outer ends have axially extending lugs 22 which are bolted as by bolt 23 to the circumscribing tubular support 18. The support or carrier 18 is covered by a rubber impregnated fabric sheath 25 which is provided with shelling means in the form of a plurality of round outwardly projecting nubs or lugs 26 which are spaced in a geometrical arrangement and adjacent ends 27 of the sheathing 25 are abutted and underlie a flat base portion 28 of a shear or clearing bar generally indicated 29 which is preferably rectangular in section and side elevation. The base portion 28 is connected to the carrier 18 by adjacent bolts 23 which also pass through the adjacent end portion of the sheathing 25 and by other bolts 30 which pass through registering apertures in the base portion 28 and the adjacent end portion of the sheathing 25 and the carrier member 18.

It will be noted in consideration of Figures 3 through 5 that the structure 29 comprises a radially outwardly projecting bar 32 which is formed integral with the base portion 28 and said bar is preferably of rectangular sectional configuration and projects radially outwardly of the outer extremities 33 of the flexible lugs 26 and said bar 32 extends lengthwise generally axially of the cylinder 15 from one end to the other thereof.

The cylinder 15 is encompassed by a top shield member 35 which is substantially concentric with the drum 15 and spaced outwardly therefrom preferably a distance sufficient to prevent recirculation of the cobs about the cylinder. The shield member 35 is interconnected preferably as by welding with the end walls 10 and 11 of the housing 9.

A concave 36 is underposed with respect to the cylinder and is so arranged that it has a convergence with the periphery of the cylinder in the direction of rotation of the cylinder as indicated by the arrow in Figure 2. The concave may be supported between the walls 10 and 11 as by welding along its lateral edges or bolting if desired and at its leading extremity 37 is abutted as at 39 against the bottom inclined wall 38 of the hopper 5 and is adapted to receive the ears of corn which include a cob with the corn kernels thereon. The unit may also receive unhusked corn and has been found not only to shell the corn off the cob but also to remove the husks. It will be realized that the ear of corn is adapted to enter gravitationally onto the top side surface or shelling face 40 of the concave 36 between the same and the periphery 41 of the shelling drum and to be rolled therebetween into the narrowing or constricting confines or space or throat 43 between the concave and the cylinder.

The concave adjacent to the intake extremity 44 of the shelling chamber 43 is provided with a smooth contoured guide bar or rod 45 which comprises an upstanding bar weld-connected to the top face 40 of the concave and said guide member 45 projecting radially toward the cylinder 15 and extending diagonally from one side of the concave to the other and terminating in an area intermediate the ends of the concave, as best seen in Figure 6. The guide member 45 is intended, with the provision of the smooth surface 46 facing toward the intake end 44 of the shelling chamber, to engage with the ears of corn as they move into the shelling chamber and to position said ears of corn crosswise or generally axially with respect to the shelling cylinder so that there is a rolling relationship between the shelling cylinder and the ears of corn along the concave surface 40 and the kernels are rolled off and not scuffed by the knobs 26 of the shelling cylinder. Scuffing would occur if the ears of corn were allowed to enter transversely of the axis of rotation of the shelling cylinder. The positioner has been found to be effective in the vast majority of cases to position the ears properly, however, once in a while an ear does enter endwise between the shelling cylinder the concave that is transverse to the axis of shaft 14 and under those circumstances the breaker bar 32 shears the cob and prevents jamming. However, even with this incidence it has been found that the breaker bar merely cuts the cob through without to any appreciable extent grinding the kernels.

The shelling throat 43 terminates in a discharge extremity 47 for discharging the cobs and some of the kernels which are swept up by the cobs and husks and which have not dropped through the perforation 48 in the concave.

It will be observed from the consideration of Figure 2 that the concave is superposed with respect to the screened discharge or outlet 50 of a fan assembly generally indicated 52, the outlet being directed to guide the air blown by the fan assembly, which is carried by the hopper structure or bin by depending plates 53, below the descending grain which falls on the inclined paneling 53' (Figure 2) and is directed to an associated receiver fragmentarily shown at 54.

The discharge of the shelling throat is controlled by a perforated gate 55 which is hingedly connected as at 56 to the trailing end of the concave on an axis generally parallel to the rotation of the cylinder 15 and said gate extending upwardly from and in extension of the concave and being biased in a direction toward the periphery of the drum by spring means 57 which is anchored at one end as at 58 to a side panel of the housing 9 and the other end of the spring means 57 being connected to the arm 59 which is connected to the gate member 55 along the lateral edge thereof. The member 55 may be fixed to the concave and not be swingable as found from actual practice. The gate member 55 is provided with an outwardly extending downwardly sloping lip member 60 (Figure 2) which with the gate member and the adjacent portion of the concave and drum projects into an internal cylinder auger 61 which serves as a discharge conveyor for the shelling mechanism, the cylinder auger 61 being suitably mounted for rotation within the enclosing housing structure 62 and including a perforated cylinder 63 with an internal auger flight 64, the perforated cylinder being adapted to sift through the openings therein any kernels which may be discharged thereinto over the gate 55 attendent to rotation of the drum, and the cobs and husks, etc. are adapted to be discharged through opening 66 in auger 61 in a direction away from the shelling mechanism through the medium of the auger flight 64 which is formed integral with the interior of the cylinder 63. It will be understood that the grain is intended to drop into the receptacle 54 through the perforations 65.

What is claimed is:

1. In a corn sheller, a support, a shelling cylinder rotatably carried thereby, peripheral shelling means on the cylinder, a concave carried by the support in partially enveloping relation to said cylinder and in radially outwardly spaced relation thereto and defining a shelling throat therewith having an intake and an outlet spaced circumferentially of the cylinder in the direction of rotation thereof, said concave having ear guide means thereon presenting a smooth contoured ear guiding surface extending toward said cylinder and elongated diagonally of the axis of rotation thereof from adjacent to said intake to intermediate the ends of said throat and from one side to the other of said concave and adapted to position ears of corn which enter endwise into said intake generally axially of said cylinder.

2. A sheller comprising a shelling cage including a concave, a cylinder rotatably supported within said cage in peripheral opposing radially spaced relationship to said concave and defining a shelling throat therewith having circumferentially spaced inlet and outlet, and a single ear positioner associated with said concave and positioned athwart said throat proximate said inlet diagonally to the axis of rotation of said cylinder, said cylinder having a length substantially equal to the span of said positioner.

3. A shelling cage comprising a concave presenting a shelling surface having circumferentially spaced receiving and discharge extremities and an ear positioner comprising a projection proximate said receiving extremity and extending outwardly from said face diagonally across the same and angularly to the axis of curvature thereof, said positioner extending substantially the full axial length of said shelling cage.

4. A sheller comprising a tubular cage, a cylinder mounted for rotation therein axially thereof, said cage having circumferentially spaced inlet and outlet and a foraminous concave therebetween presenting a shelling face opposing said cylinder and converging therewith in the direction of rotation of said cylinder from said inlet toward said outlet, an ear positioning bar fixed to said concave and disposed in the inlet area and projecting widthwise toward said cylinder and lengthwise diagonally across said face from adjacent said inlet toward said outlet in intercepting relation to ears of corn passing between said face and said cylinder.

5. A sheller comprising a shelling cylinder, a concave disposed in opposing relation therewith and developing an inlet area at one end and an outlet area at the other end, and an ear positioner on the concave projecting toward the cylinder and extending angularly across said inlet area from one side to the other thereof and located wholly within said inlet area.

6. A sheller comprising a shelling cylinder, a concave disposed in opposing relation therewith and developing an inlet area at one end and outlet area at the other end, and an ear positioner on the concave projecting toward the cylinder and extending angularly across said inlet area from one side to the other thereof within said inlet area, and said positioner comprising a single bar having a rounded edge opposing the cylinder and spaced radially outwardly therefrom.

7. A shelling cage comprising a concave presenting a shelling surface and having an inlet area and an outlet area, said areas disposed in substantially common radial planes, and an ear positioner on said concave within said inlet area comprising a bar extending widthwise radially from said surface and lengthwise diagonally to the axis of curvature of the concave and presenting a smooth outer edge spaced from said surface in a direction toward the axis of curvature of the concave.

References Cited in the file of this patent
UNITED STATES PATENTS

| | | |
|---|---|---|
| 19,160 | Smith | Jan. 19, 1858 |
| 1,770,792 | Lizamore | July 15, 1930 |